United States Patent [19]

Voights

[11] 4,411,629
[45] Oct. 25, 1983

[54] PALPATION AND AUSCULTATION TEACHING METHOD AND APPARATUS

[76] Inventor: Dora L. Voights, 737 S. 6th Ave., La Grange, Ill. 60525

[21] Appl. No.: 359,146

[22] Filed: Mar. 17, 1982

[51] Int. Cl.³ .............................................. G09B 23/34
[52] U.S. Cl. ..................................... 434/266; 434/273
[58] Field of Search ................. 46/116; 434/262, 265, 434/266, 267, 268, 272, 273, 236

[56] References Cited

U.S. PATENT DOCUMENTS

| 451,675 | 5/1891 | Klautsch | 434/273 |
| 2,551,433 | 5/1951 | Graves | 434/273 |
| 2,945,304 | 7/1960 | Niiranen | 434/268 |
| 3,822,486 | 7/1974 | Knapp | 434/273 |
| 4,197,670 | 4/1980 | Cox | 434/273 X |

FOREIGN PATENT DOCUMENTS 323347 9/1957 Switzerland ....................... 434/268

Primary Examiner—Harland S. Skogquist
Attorney, Agent, or Firm—Gary, Juettner & Pyle

[57] ABSTRACT

Method and apparatus for teaching students palpation and auscultation of a fetus in a pregnant female, comprising a fetal doll, a loud speaker attached to the fetal doll, a recording of fetal heart tones, means for reproducing the recording and transmitting the tones to the loud speaker, a cushion having an opening in which the fetal doll is inserted, filling material packed into the cushion surrounding the doll, an outer cover in which the cushion is adjustably, movably inserted, and a plurality of straps for attaching the cover containing the cushion onto a female model to simulate pregnancy; whereupon the position of the fetal doll may be adjusted relative to the abdomen of the model and the students guided in palpation techniques for locating and identifying the position of the fetal doll, and the simulated fetal heart tones may be varied to simulate real-life fetal heart conditions and the students guided in auscultation techniques for medically assessing the simulated fetal heart tones.

1 Claim, 4 Drawing Figures

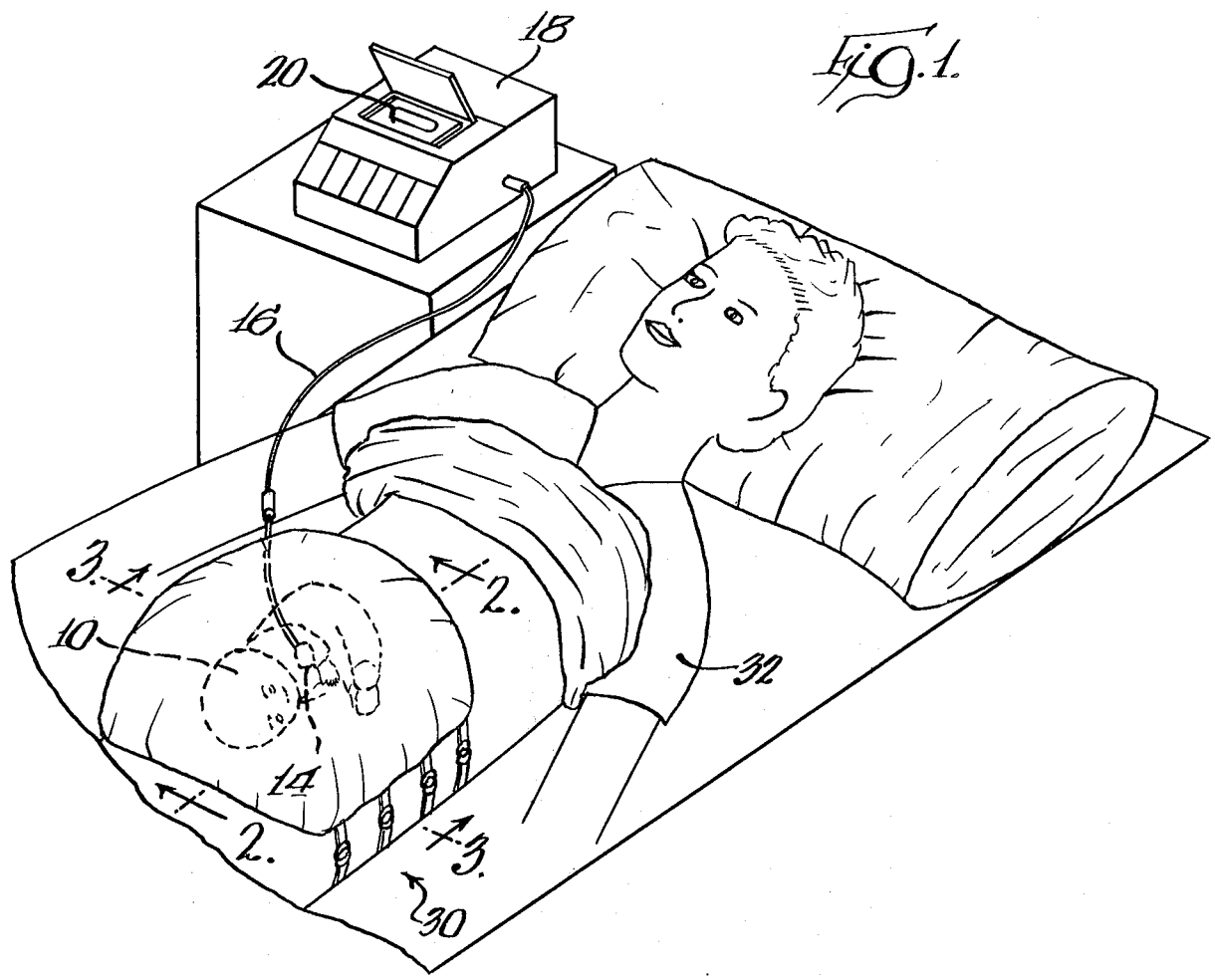
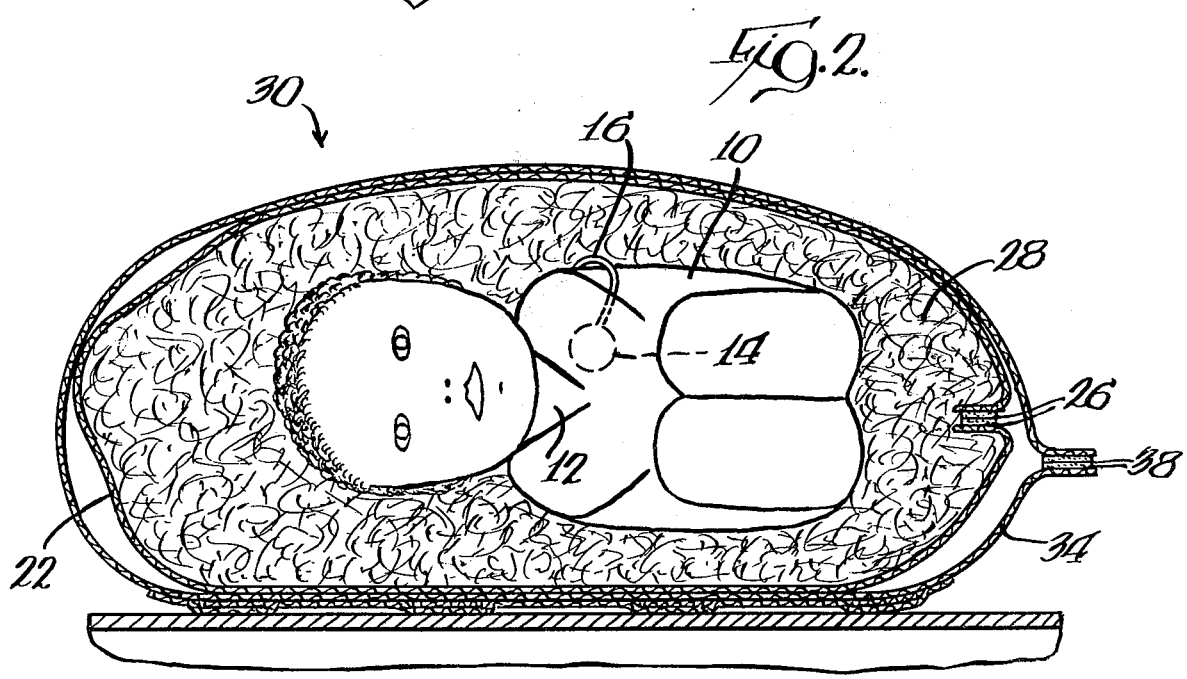

U.S. Patent   Oct. 25, 1983   Sheet 2 of 2   4,411,629
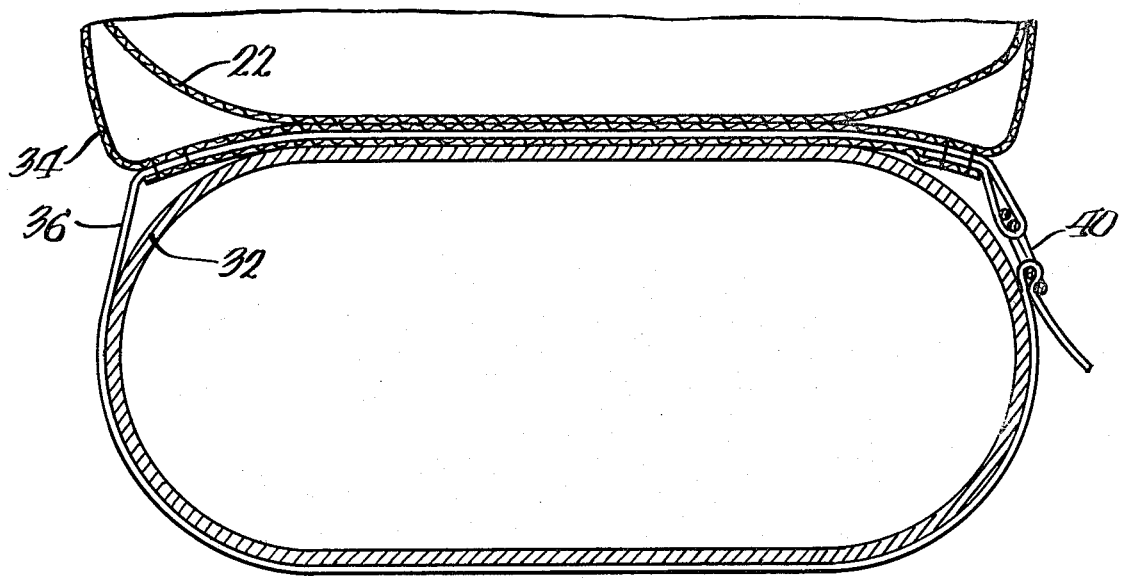
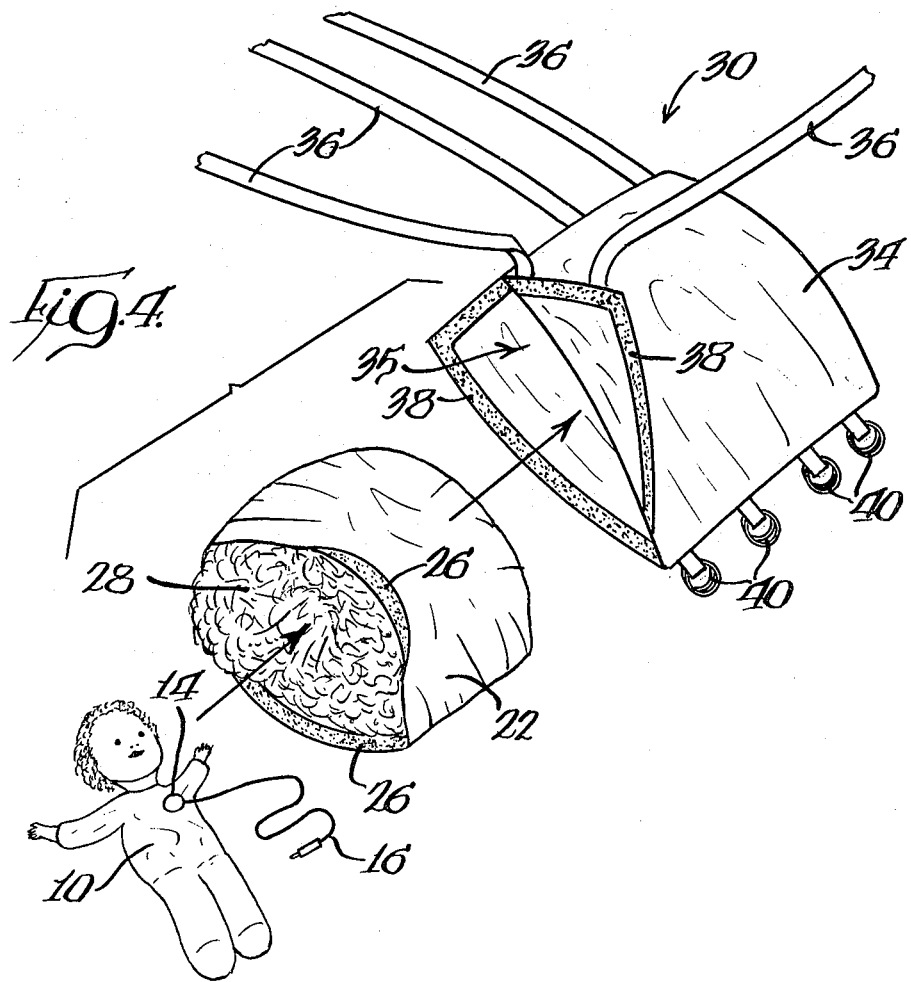

PALPATION AND AUSCULTATION TEACHING METHOD AND APPARATUS

BACKGROUND OF THE INVENTION

The present invention relates to teaching techniques in the medical field and more particularly to a method and apparatus that are used to teach palpation and auscultation techniques for locating, identifying and assessing the condition of a fetus in a pregnant female.

It is important in the medical and veterinarian professions to assess and diagnose the condition of pregnant females and their unborn offspring. Palpation techniques, known as "Leopold's maneuvers", have been developed for identifying which part of the fetus lies in the fundus of the uterus, determining the location of the back of the fetus in relation to the right and left abdominal quadrants of the mother and determining which part of the fetus lies in the inlet. Palpation thus enables the doctor, nurse or veterinarian to determine whether the birth will be normal or abnormal. If an abnormal condition is located by palpation, corrective measures can be taken to insure a healthy mother and child. Thus, proper palpation techniques are vital to diagnosis of pregnant females.

Auscultation techniques are also vital in diagnosis. Auscultation is performed with a fetoscope, which is a sensitive stethoscope adapted for the purpose of detecting sounds produced by the fetus. Auscultation techniques involve counting and timing the fetal heart beats to determine the fetal heart rate. Also, it is important to listen for any fetal heart irregularities. Thus, as with palpation, auscultation techniques are vital to diagnosis of pregnant females.

Since palpation and auscultation techniques are so important, it is desirable that doctors, nurses and veterinarians have sufficient training and a practice in these techniques before encountering real-life situations.

It is desirable in the medical education professions to have an apparatus that simulates various real-life fetal conditions in a pregnant female. Pregnant women and/or pregnant animals are not readily available for use in the class room. Indeed, most pregnant women are not willing to be used as "guinea pigs" for teaching student nurses and doctors palpation and auscultation techniques. Also with live models, obviously, it is not possible to vary the fetal positions or the fetal heart tones. Thus, it is not possible to expose the students to the many real-life conditions that they may experience in later, actual practice.

SUMMARY OF THE INVENTION

The present invention provides a method and apparatus for teaching palpation and auscultation techniques under simulated but nevertheless "hands-on" conditions.

The apparatus of the invention comprises a fetal doll to which a loud speaker is attached in a location corresponding to that of the human heart. The loud speaker is connected by wires to means for reproducing a recording of fetal heart tones, such as a record player or tape recorder. The means for reproducing a recording is loaded with a recording of actual fetal heart tones. The recording may then be played, thus simulating fetal heart tones in the doll.

The doll is placed into a cushion having an opening at one end. The cushion is packed with a filling material such as cotton to simulate a pregnant abdomen. The cushion may then be slipped into an outer cover. The cushion may be rotated or flipped within the cover to change the position of the fetal doll without having to unpack and repack the filling material. The outer cover is equipped with a plurality of straps for strapping the cover containing the cushion onto a female model. The model may be a live person or may be a mannequin.

Thereafter, a trained doctor or nurse guides students in proper palpation techniques for locating and identifying the position of the fetal doll within the cushion. The position of the cushion containing the doll may then be moved and the guiding process repeated. The trained doctor or nurse also guides students in proper auscultation techniques, i.e., use and manipulation of the fetoscope for locating the best position to determine heart sounds and for medically counting and assessing the simulated fetal heart tones. The recordings of the fetal heart tones may be changed and the guiding process repeated.

Thus, the students may receive training and practice in palpation and auscultation techniques under realistically simulated and hands-on conditions, prior to practice in real-life situations. Also, the students may be exposed to a whole variety of fetal conditions which may be encountered in actual practice.

A BRIEF DESCRIPTION OF THE DRAWINGS

FIG. 1 is a perspective view of the preferred embodiment of the apparatus of the present invention strapped onto a mannequin.

FIG. 2 is a longitudinal section through the apparatus taken along line 2—2 of FIG. 1.

FIG. 3 is a transverse section taken along line 3—3 of FIG. 1.

FIG. 4 is an exploded perspective of the illustrating the assembly process.

DETAILED DESCRIPTION OF THE INVENTION

As shown in the drawings, the preferred embodiment of the apparatus of the invention generally comprises a fetal doll 10, having a chest 12. The doll 10 may be an ordinary child's doll of the approximate size of a full-term fetus. Preferably, the doll's head should be made from a resilient material such as plastic; and its body, from a soft material such as cloth stuffed with cotton, to simulate the density and texture of an actual fetus.

A loud speaker 14 is attached to the doll's chest 12 in a location simulating that of the human heart. The speaker 14 may be an ordinary minature loud speaker, sufficiently small to simulate a real heart and such that it does not unduly protrude from the doll 10, as shown in the accompanying figures. The speaker 14 is electrically connected by one or more wires 16 to a means 18 for reproducing a recording 20. The means 18 may be a tape player as shown in FIG. 1, or a phonograph. The means 18 is loaded with a recording 20 of fetal heart tones and is operated to play the recording and transmit the fetal heart tones to the speaker 14, thereby simulating fetal heart tones in the doll 10.

A cushion 22 is provided with an opening 24 into which the doll 10 is inserted. The cushion 22 may be sewn from fabric, preferably a washable fabric such as cotton. The cushion 22, around the opening 24, is provided with resealable fastening means 26 such as an adhesive strip, snaps, or hook and loop tape. The cushion 22 is packed, in surrounding relation to the doll 10, with soft filling material 28 such as cotton or foam rubber, as illustrated in FIG. 2, so as to simulate abdominal tissue surrounding the fetus.

Strapping means, shown generally at 30, are provided to strap the cushion 22 containing the doll 10, onto the abdomen of a female model 32. The female model 32 may be a live person or a mannequin. The assembly thus simulates a pregnant female.

In the preferred embodiment, the strapping means 30 comprises an outer cover 34 and a plurality of straps 36. The outer cover 34 has an opening 35 in which the cushion 22, containing the doll 10, may be adjustably, movably inserted. The cushion 22 may thus be rotated and/or flipped within the cover 34 to simulate various real-life fetal positions. These adjustments may be made without having to unpack and repack the filling material 28 in the cushion 22 surrounding the doll 10. The outer cover 34, around its opening 35, is provided with resealable fastening means 38 such as an adhesive strip, snaps, or hook and loop tapes. The outer cover 34 is sewn from fabric, preferably a washable fabric such as cotton.

A plurality of straps 36 are attached to the cover 34 for strapping the cover 34 containing the cushion 22 onto the model 32, as shown in FIGS. 1 and 3. The straps are preferably made from fabric. Fasteners 40, such as double rings, are provided for securing the straps 36.

Upon assembly of the apparatus of this invention, a trained doctor or nurse guides students in palpation techniques and Leopold's maneuvers for locating and identifying the position of the fetal doll 10 relative to the abdomen of the model, and for identifying what part of the fetus lies in the fundus of the uterus, determining the location of the back of the fetus in relation to the right and left abdominal quadrants of the mother and for determining what part of the fetus lies in the inlet. The recording 20 of the fetal heart tones may be played, whereupon the trained doctor or nurse guides students in auscultation techniques, i.e., use and manipulation of the fetoscope for locating the best position to determine heart sounds and for medically counting and assessing the simulated fetal heart tones. The position of the doll 10 may be moved, as described above, and the palpation exercises repeated. Likewise, different tapes of fetal heart tones may be played and the auscultation exercise repeated. Thus, the student receives both a proper education and practical experience in learning these techniques under realistically simulated conditions.

While the above detailed description relates to a human mother and child, it is appreciated that this device and teaching method may be adapted to veterinarian medicine as well. Further, while the preferred embodiment of the invention, and a representative mode of use thereof, have been illustrated and described herein, it is to be appreciated that changes, modifications and variations may be made therein without departing from the scope of the invention as defined by the appended claims.

What is claimed is:

1. Apparatus for teaching palpation and auscultation of a fetus in a pregnant female utilizing a female model, comprising:
   a fetal doll;
   means for simulating fetal heart tones attached to said fetal doll;
   a cushion having an opening in which said fetal doll is inserted;
   filling material packed into said cushion, surrounding said fetal doll;
   an outer cover for said cushion;
   a strap attached to said cover for strapping said cover containing said cushion to the female model; and
   said outer cover having an opening in which said cushion is removably inserted, said cushion being adjustably movable within said cover for varying the position of said fetal doll relative to the female model to simulate different real-life fetal positions.

* * * * *